United States Patent [19]

Lammers

[11] Patent Number: 4,752,281
[45] Date of Patent: Jun. 21, 1988

[54] ISOLATED TOOTH DRIVE SPROCKET ASSEMBLY

[75] Inventor: Bryan G. Lammers, Davenport, Iowa

[73] Assignee: Caterpillar Inc., Peoria, Ill.

[21] Appl. No.: 927,207

[22] Filed: Nov. 5, 1986

[51] Int. Cl.$^4$ ............................................. F16H 55/12
[52] U.S. Cl. .................................... 474/162; 474/161
[58] Field of Search ............................... 474/161–163, 474/153, 152, 207, 94

[56] References Cited

U.S. PATENT DOCUMENTS

| | | | |
|---|---|---|---|
| 1,870,801 | 8/1932 | Engstrom | 474/161 X |
| 1,983,548 | 12/1934 | Knox et al. | 474/207 X |
| 2,101,685 | 12/1937 | Nisbet | 474/161 |
| 2,365,544 | 12/1944 | Geyer et al. | 474/161 |
| 3,960,412 | 6/1976 | Shuler | 474/162 X |
| 3,996,814 | 12/1976 | Westlake | 474/162 |
| 4,069,856 | 1/1978 | Sogge | 152/27 |
| 4,332,573 | 6/1982 | Uchida et al. | 474/94 |
| 4,511,186 | 4/1985 | Sasamoto | 305/57 |
| 4,522,611 | 6/1985 | Hiatt | 474/162 |
| 4,585,431 | 4/1986 | Umeda et al. | 474/94 |

FOREIGN PATENT DOCUMENTS

| | | |
|---|---|---|
| 0006250 | 8/1981 | European Pat. Off. |
| 2914127 | 8/1980 | Fed. Rep. of Germany |
| 2082525 | 3/1982 | United Kingdom |
| 2158195 | 11/1985 | United Kingdom |

Primary Examiner—Stephen J. Novosad
Assistant Examiner—Thuy M. Bui
Attorney, Agent, or Firm—Claude F. White

[57] ABSTRACT

A drive sprocket assembly for driving an endless chain assembly for propelling a vehicle includes a support hub which is mountable to the power output portion of the vehicle and a plurality of replaceable teeth which are mountable to the hub. Each tooth is resiliently isolated from the support hub, and resilient to the chain assembly, by non-metallic materials to reduce noise generated by the sprocket teeth striking the endless chain assembly. Conventional drive sprocket assemblies use a one piece toothed sprocket, or segments having several teeth, bolted to a support member. These prior sprocket assemblies generate considerable noise from impacting of the sprocket teeth with an endless chain. The subject sprocket assembly produces low levels of noise by utilizing individual replaceable teeth which are isolation mounted to the sprocket support hub.

13 Claims, 2 Drawing Sheets

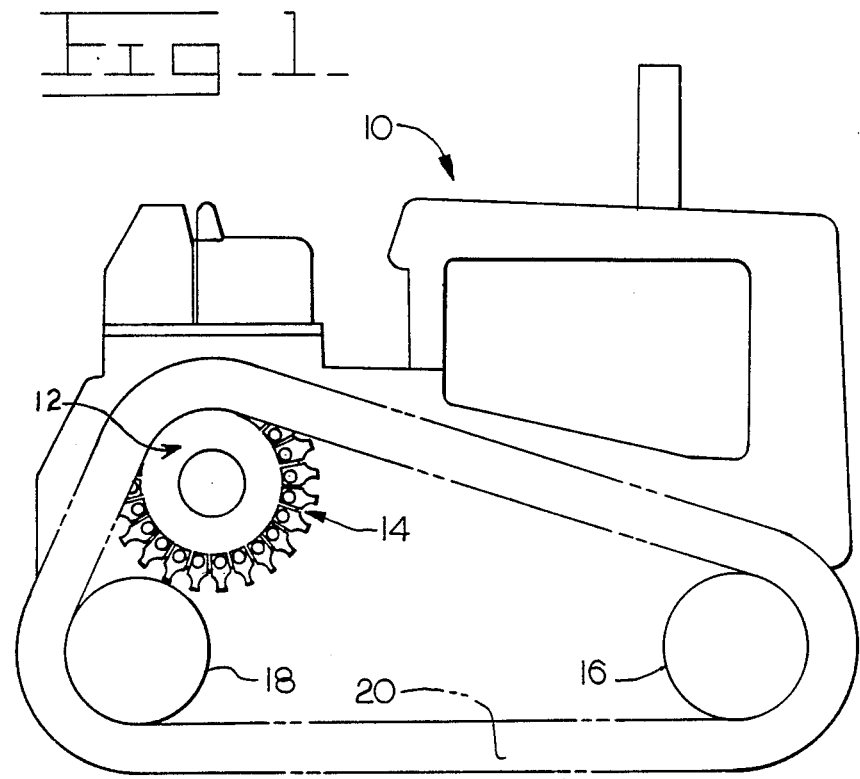
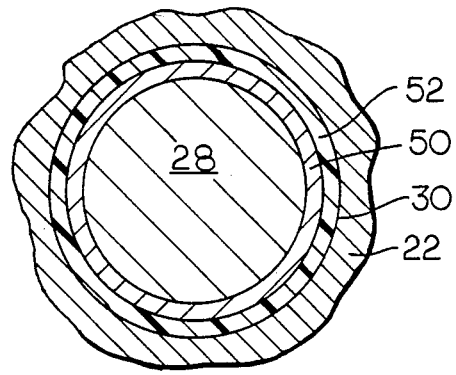

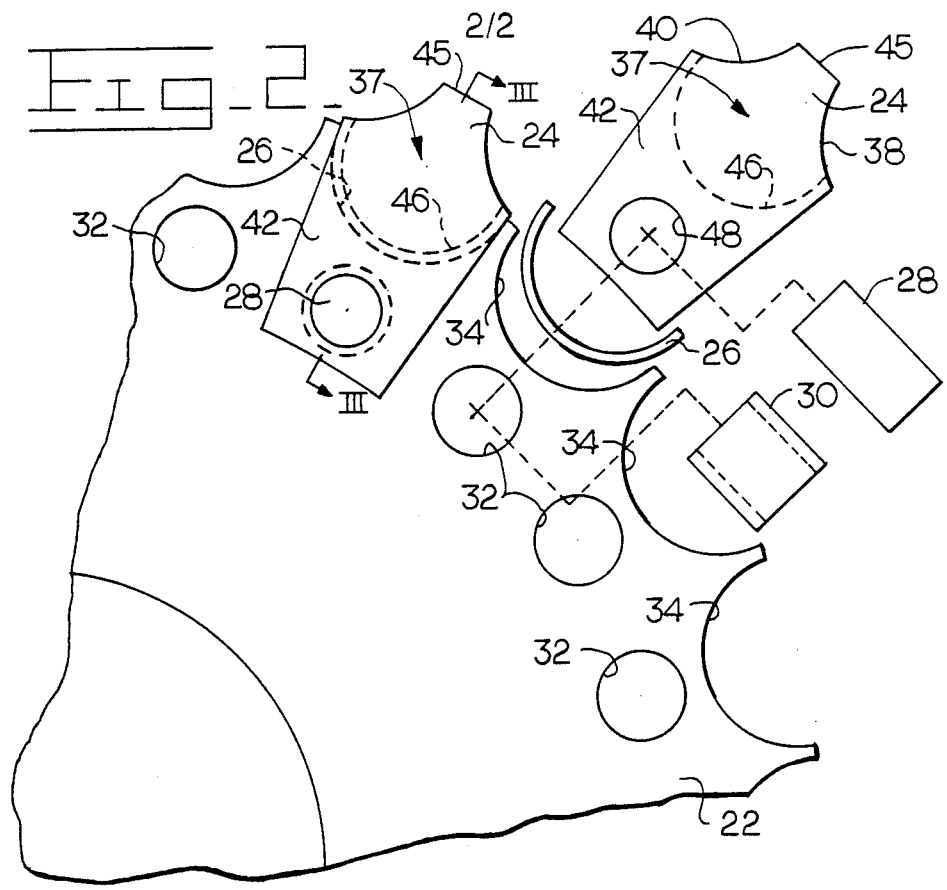
Fig_2
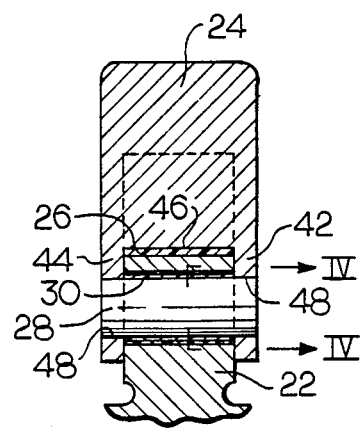
Fig_3

ISOLATED TOOTH DRIVE SPROCKET ASSEMBLY

TECHNICAL FIELD

This invention relates generally to a drive sprocket assembly for a vehicle and, more particularly, to a drive sprocket assembly having a plurality of individual replaceable teeth with each tooth being resiliently isolated from the drive sprocket support hub.

BACKGROUND ART

Earthmoving and construction vehicles which utilize endless track chain assemblies for support and propulsion generally include a sprocket for engaging and driving the chain assembly. Such sprockets can include a single member having a plurality of integral teeth, a circular support member for supporting sprocket segments each having several teeth, and hub members for accommodating a plurality of separate, individual teeth.

One type of sprocket having a plurality of separate, individual teeth bolted to a hub portion is disclosed in U.S. Pat. No. 2,365,544, issued to H. D. Geyer et al. on Dec. 19, 1944. In this patent, the teeth are fulcrumed to the hub portion somewhere near the middle of the teeth so the teeth can rotate in either direction about the fulcrum. Resilient means are provided to return the teeth to their original no load position. This arrangement is intended to make the teeth self adjusting to accommodate variations in the track chain.

Another type of sprocket having separate, individual teeth secured to a hub is shown in U.S. Pat. No. 3,996,814, issued to G. E. Westlake on Dec. 14, 1976. This patent discloses a plurality of link members secured together around the circumference of a hub. The links are keyed longitudinally and laterally on the hub. Each link carries one or more separate teeth projecting radially outwardly.

Still another type of sprocket assembly with replaceable teeth is shown in U.S. Pat. No. 4,522,611, issued to D. M. Hiatt on July 11, 1985. This patent discloses a generally cylindrical sprocket hub equipped with a plurality of L-shaped pockets in the periphery of the hub. A replaceable tooth, having a partial T-shaped inner end, is intended to be received within each of the L-shaped pockets and locked in place by wedge lock means which operate against the T-shape of the tooth.

Each of the above-noted sprocket assemblies provide individually replaceable drive teeth. However, such sprocket assemblies appear to be quite complicated and costly and utilize intricately formed pieces. All of the above-noted patents would appear ineffective or quite limited in their ability to reduce noise levels during driving operation against an endless track chain assembly.

The present invention is directed to overcoming one or more of the problems as set forth above.

DISCLOSURE OF THE INVENTION

In one aspect of the present invention, a drive sprocket assembly for transferring power from a first machine element to a second machine element includes a support hub having a plurality of pin receiving openings and a plurality of concave cavities spaced radially outwardly from the openings. The support hub is connectable to the first machine element. The drive sprocket assembly further includes a plurality of teeth and a plurality of connecting pins for connecting the teeth to the support hub. Each of the teeth has a convex seat portion and a pair of side portions, with each side portion having a pin receiving opening. One of the connecting pins penetrates the openings in the side portions of each tooth and one of the openings in the support hub to connect each tooth to the hub.

In track laying vehicles utilizing endless track assemblies, the power from the vehicle is transferred to the endless track assemblies by toothed sprocket members. As the sprockets contact the endless track, noise is generated, which can reach objectionable levels. Additionally, this noise is often trasferred into the endless tracks and other machine elements where it is amplified. The subject invention provides a reduced noise level sprocket assembly for driving the endless track by utilizing a plurality of individual drive teeth of low mass which are resiliently isolated from other components of the drive sprocket assembly. Additionally, the undercarriage components and power train of the vehicle will experience lower stress since the resiliency of the subject sprocket assembly will limit shock loads.

BRIEF DESCRIPTION OF THE DRAWINGS

FIG. 1 is a diagrammatic side elevational view of a vehicle incorporating the isolated tooth drive sprocket assembly of the present invention;

FIG. 2 is an enlarged diagrammatic view of a portion of the drive sprocket assembly of the present invention with one of the teeth and related components in exploded position;

FIG. 3 is a diagrammatic sectional view taken generally along lines III—III of FIG. 2; and FIG. 4 is a diagrammatic sectional view taken generally along lines IV—IV of FIG. 2.

BEST MODE FOR CARRYING OUT THE INVENTION

Referring to the drawings, a machine or vehicle 10, such as a track-type tractor, has a final drive 12, a toothed drive wheel apparatus or sprocket assembly 14, front and rear idler wheels 16,18, and an endless chain assembly 20 which encircles the sprocket assembly 14 and the idler wheels 16,18. The sprocket assembly 14 transfers power from a first machine element, such as the final drive 12, to a second machine elment, sucn as the endless chain assembly 20 for propelling the vehicle 10.

The sprocket assembly 14 includes a support hub 22, a plurality of individually replaceable teeth 24, a plurality of non-metallic bearing inserts 26, and a plurality of connecting pins 28 and bushings 30. The support hub 22 has a plurality of circularly arranged pin receiving openings 32 and a plurality of circumferentially oriented semi-circular or concave cavities 34 spaced radially outwardly from the openings 32. Each of the teeth 24 includes a main body portion 37 having first and second contact driving surfaces 38,40, a substantially flat surface portion 45 connecting the contact surfaces 38,40, and spaced apart parallel side wall portions 42,44. Each tooth further includes a convex, or semi-circular, seat portion 46 which separates the side portions 42,44 and extends between the first and second contact surfaces 38,40.

Each of the side portions 42,44 connects to the main body portion 37 and has an opening 48 for receiving one of the pins 28. The opening 48 in the side portion 42 is substantially axially aligned with the opening 48 in the side portion 44. Each connecting pin 28 connects one of the teeth 24 to the support hub 22 by penetrating one of the supporting openings 32 and the side portion openings 48. One of the non-metallic bearing inserts 26 is positioned between each convex seat portion 46 and each concave cavity 34 when each tooth 24 is connected to the support hub 22.

One of the bushings 30 is inserted into each support ring opening 32 before the teeth 24 are fastened to the support hub 22. In the assembled position of the teeth 24 on the support hub 22, one of the bushing 30 surrounds each of the connecting pins 28. Each of the bushings 30 is a composite including an inner metallic sleeve 50 and an outer non-metallic sleeve 52, with the two sleeves being bonded together. The inner sleeve 50 is preferably a steel material and the outer sleeve 52 is preferably a resilient material, such as rubber.

One of the bearing inserts 26 is preferably bonded to either the convex seat portion 46 of a tooth 24, or to the respective concave cavity 34 of the support hub 22. However, if desired, the inserts 26 need not be bonded in place and can be merely held captive between the convex seat portions 46 and the complimentary mating concave cavities 34. The inserts 26 are preferably formed from an organic plastic material, such as polyester, which have predetermined elastic qualities. The bearing inserts 26 are essentially maintenance free since they require no sealing or lubrication.

Industrial Applicability

The subject isolated tooth drive sprocket assembly 14 is particularly useful with earthmoving vehicles and more specifically, track-type vehicles, such as vehicle 10. Power from the engine of the vehicle 10 is transmitted to the final drive 12 which then rotates the sprocket assembly 14. As the sprocket assembly 14 rotates, the teeth 24 contact portions of the endless chain assembly 20, rotate it, and thereby propel the vehicle.

Contact between the metal teeth 24 and the metal chain assembly 20 generates noise. Because the teeth 24 are isolated from the metal support hub 22, the noise is not transferred into the support hub 22 and the final drive 12 where it could be amplified. Likewise, because of the isolation of the teeth 24, each tooth is a relatively small member which generates very little noise as it contacts the chain assembly 20. Any amplification of such noise by the chain assembly 20 is therefore of small magnitude.

The isolation of the teeth 24 is provided by the composite bushings 30 and the bearing inserts 26. Each of the bushings 30 has an outer sleeve 52 of resilient material and each of the bearing inserts 26 is formed of a non-metallic organic plastic material.

Other aspects, objects, and advantages of this invention can be obtained from a study of the drawings, the disclosure, and the appended claims.

I claim:

1. A drive sprocket assembly for transferring power from a first machine element to a second machine element comprising:
   a support hub having a plurality of pin receiving openings and a plurality of open sided concave cavities spaced radially outwardly from said openings, each of said cavities being in substantial radial alignment with one of said openings, said hub being connectable to said first machine element;
   a plurality of individually replaceable teeth, each tooth having first and second exterior contact surfaces, first and second side portions, and a convex seat portion, said side portions each having a pin receiving opening, said seat portion being positioned between said pin receiving opening and said contact surfaces;
   a plurality of connecting pins, each pin adapted to extend through one of said pin receiving openings in said support hub and openings in said side portions of a respective tooth for connecting said tooth to said support hub; and
   a plurality of non-metallic bearing inserts, one insert adapted to be positioned between each tooth seat portion and each hub concave cavity in the connected condition of said tooth to said hub.

2. The drive sprocket assembly, as set forth in claim 1, including a plurality of bushings, each bushing adapted to be fitted into a respective support hub opening and about one of said pins in the connected conditions of said teeth to said support hub.

3. The drive sprocket assembly, as set forth in claim 2, wherein said bushings include an inner metallic sleeve and an outer non-metallic resilient sleeve bonded to said metallic sleeve.

4. The drive sprocket assembly, as set forth in claim 1, wherein said inserts are individually replaceable and are formed of an organic plastic material.

5. The drive sprocket assembly, as set forth in claim 1, wherein said inserts are formed of polyester.

6. The drive sprocket assembly, as set forth in claim 1, wherein said inserts are bonded to one of the convex seat portion of a respective tooth and the respective concave cavity of said support ring.

7. The drive sprocket assembly, as set forth in claim 1, wherein each tooth includes a substantially flat surface portion positioned between and connecting said first and second contact surfaces.

8. The drive sprocket assembly, as set forth in claim 1, wherein said convex seat portion extends between said first and second contact surfaces.

9. A replaceable and reversible tooth for a drive sprocket assembly comprising:
   a main body portion having first and second exterior contact surfaces and a substantially flat surface portion extending between and connecting said contact surfaces;
   first and second spaced apart parallel side portions each connected to said body portion and extending outwardly therefrom, each side portion having a pin receiving opening axially aligned one with the other; and
   a convex seat portion positioned between said pin receiving openings and said contact surfaces and extending between said side portions.

10. The replaceable and reversible tooth, as set forth in claim 9, including a non-metallic bearing insert bonded to said seat portion.

11. The replaceable and reversible tooth, as set forth in claim 10, wherein said insert is formed of an organic plastic material.

12. A toothed drive wheel apparatus, adapted to drive an endless chain assembly for propelling a vehicle, comprising:
   a support hub having a plurality of circularly arranged pin receiving openings and a plurality of semi-circular open side cavities spaced radially outwardly from said openings, said hub being connectable to the vehicle;

a pluraltiy of replaceable drive teeth, each tooth having forward and rearward exterior drive surfaces, first and second side walls, and a semi-circular seat surface enclosed by said side walls, each side wall having a pin receiving opening axially aligned one with the other;

a plurality of connecting pins, each pin connecting a respective drive tooth to said support hub and respective openings in said tooth side walls;

a plurality of non-metallic bearings, each positioned between a respective seat surface and a respective semi-circular cavity and resiliently mounting the respective drive teeth to said support hub; and a plurality of composite bushings, each positioned within a respective pin receiving opening in said support hub.

13. The toothed drive wheel apparatus, as set forth in claim 12, wherein said composite bushings include an outer shell of non-metallic resilient material and an inner shell of metallic material.

* * * * *

UNITED STATES PATENT AND TRADEMARK OFFICE
CERTIFICATE OF CORRECTION

PATENT NO. : 4,752,281

DATED : June 21, 1988

INVENTOR(S) : Bryan G. Lammers

It is certified that error appears in the above-identified patent and that said Letters Patent is hereby corrected as shown below:

In claim 2 at column 4, line 18, change "conditions" to
--condition--.

In claim 12 at column 4, line 66, change "side" to --sided--.

In claim 12 at column 5, line 8, after "hub" insert --by penetrating a respective pin receiving opening in said support hub--.

Signed and Sealed this

Twenty-ninth Day of November, 1988

Attest:

DONALD J. QUIGG

*Attesting Officer*     *Commissioner of Patents and Trademarks*